B. D. GULLETT.
Cotton-Gins.
No. 6,035. Reissued Sept. 1, 1874.
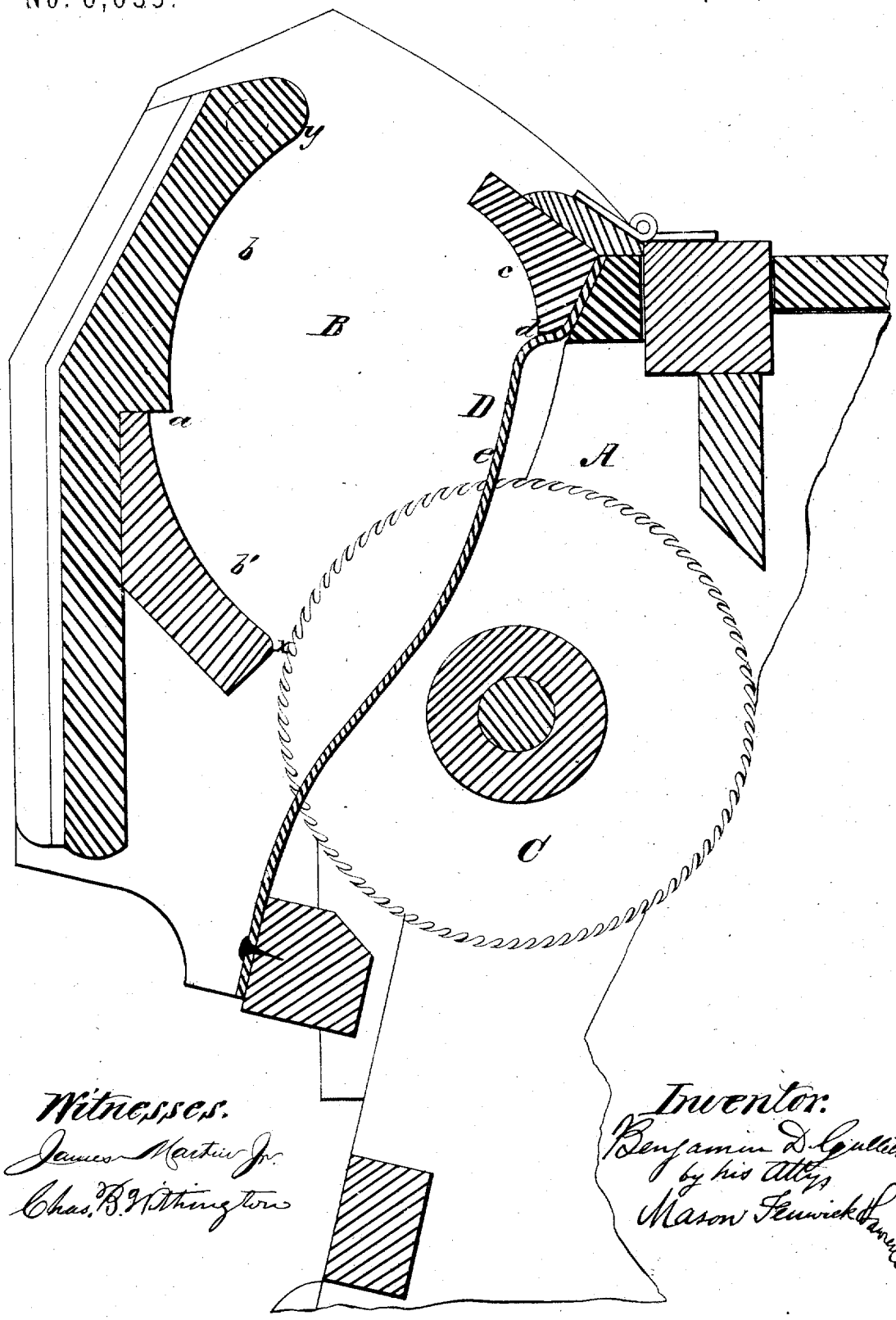
Witnesses.
James Martin Jr.
Chas. B. Withington
Inventor:
Benjamin D. Gullett
by his Attys
Mason Fenwick & Lawrence

UNITED STATES PATENT OFFICE.

BENJAMIN D. GULLETT, OF AMITE CITY, LOUISIANA, ASSIGNOR TO THE GULLETT GIN MANUFACTURING COMPANY, OF SAME PLACE.

IMPROVEMENT IN COTTON-GINS.

Specification forming part of Letters Patent No. 140,365, dated July 1, 1873; reissue No. 6,035, dated September 1, 1874; application filed February 26, 1874.

DIVISION B.

*To all whom it may concern:*

Be it known that I, BENJAMIN D. GULLETT, of Amite City, in the parish of Tangipahoa and State of Louisiana, have invented a new and useful Improvement in Hoppers for Cotton-Gins; and I do hereby declare that the following is a full, clear, and exact description thereof, reference being had to the accompanying drawing making part of this specification, in which the drawing represents a vertical longitudinal section of a portion of a cotton-gin, the section being taken at a right angle to the shaft of the gin-saws.

My invention relates to an improved construction of the roll or ginning box, in which the cotton is fed to saws, which extend through the ribbed breast of a cotton-gin.

To enable others skilled in the art to make and use my invention, I will proceed to describe it.

A represents a part of a cotton-gin, which is properly housed in. B is the hopper; C, the ginning-saws; and D, the ribbed breast, through which the saws work. The hopper B is hinged, as usual, at its upper end, so that it can be turned up when it is desired to obtain access to the gin-saws. The inner surface of the hopper on the front side is formed of segments of two ellipses struck from different points. The elliptical segment *b* terminates near the middle of the vertical depth of the hopper, and is united with the segment *b'*, which cuts back farther into the front board of the hopper by means of a horizontal shoulder, *a*. The segment *b'* extends down from the back of this shoulder in a forward direction nearly to the teeth of the saws. The two segments are so struck that, if the upper one were continued down to the point *x*, it would just about unite with the lower terminus of the segment *b'*, and, if the segment *b* were continued up to the point *y*, it would just about unite with the upper terminus of the segment *b*. By this means the roll of cotton runs down on the segment *b* to the shoulder *a*, and receives its necessary turn or direction toward the saw, and from that point descends with less friction toward the point *x*, where it is caught by the saws, thus insuring very perfect feeding of the cotton to the saws. The back board of the hopper is curved at *c*, and may be regarded as a shorter segment of an elliptical figure. This curved portion rests down upon the top or shoulder *d* of the concave portion *e* of the ribs of the breast. The base of this part stands back of the shoulder *d* of the breast, and by this means the cotton is prevented from rising too high, as the saws press it upward through the ribbed breast, and the rolls have a direction toward the front part of the hopper in case they should slip away from the saw-breast.

It will be observed that the upper surface *b* curves so as, with the surface *c*, to contract the mouth of the hopper, while the surface *b'* recedes, at the shoulder *a*, from the gin-saws, and thereby increases the area between the front board and the saws, giving greater room for the rolls to move in as they travel to the point *x*, where the saws take hold of them.

The curves of the interior of the hopper may be varied slightly so long as the shoulder *a* is maintained.

What I claim as new is—

The cotton-gin hopper constructed with the surfaces *b b'*, the shoulder *a*, and the concave surface *c*, for reducing friction upon the cotton in its passage to the ribs and saws, substantially as set forth.

BENJAMIN DAVID GULLETT.

Witnesses:

STEPHEN D. ELLIS,
BARRITT T. MILLICAN.